United States Patent [19]

Senese et al.

[11] Patent Number: 4,630,467
[45] Date of Patent: Dec. 23, 1986

[54] LEAK DETECTOR

[75] Inventors: Frank J. Senese; Lloyd A. Baillie, both of 400 E. Sibley Blvd., Harvey, Ill. 60426

[73] Assignees: Frank J. Senese; Lloyd A. Baillie, both of Ill.

[21] Appl. No.: 704,230

[22] Filed: Feb. 22, 1985

Related U.S. Application Data

[60] Continuation of Ser. No. 616,042, Jun. 1, 1984, abandoned, which is a division of Ser. No. 340,439, Jan. 18, 1982, Pat. No. 4,453,400.

[51] Int. Cl.$^4$ .................... G01M 3/38; G01F 23/10
[52] U.S. Cl. ........................................ 73/49.2; 73/293
[58] Field of Search ...................... 73/49.3, 293, 313

[56] References Cited

U.S. PATENT DOCUMENTS 2,657,577 11/1953 Falk .................................. 73/313 X
3,805,613  4/1974 Stone ................................. 73/313
4,453,400  6/1984 Senese et al. ..................... 73/49.2

Primary Examiner—Stewart J. Levy
Assistant Examiner—Joseph W. Roskos
Attorney, Agent, or Firm—E. Janet Berry

[57] ABSTRACT

A method for detecting small leaks in a tank storing a liquid by measuring changes in the location of a float suspended in the liquid. The method includes the steps of sealing the float to prevent the condensation of vapors within the float, positioning the float at a preselected depth, modulating an emitted signal by an amount which varies with the changes in the location of the float, and detecting the modulated signal. Changes in the signal are indicative of small changes in the location of the float and small leaks in the tank.

8 Claims, 6 Drawing Figures

FIG. 5
FIG. 6
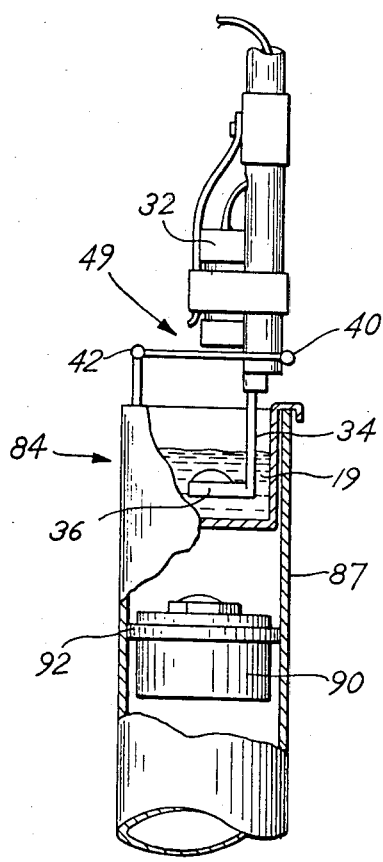
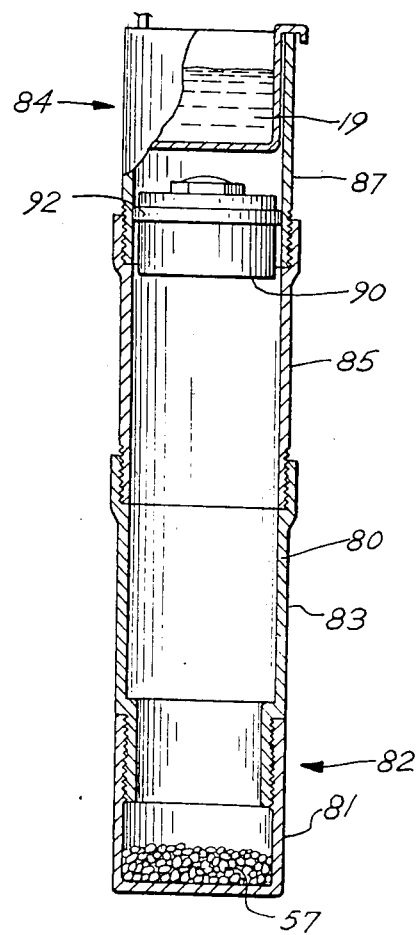

LEAK DETECTOR

This is a continuation of Application Ser. No. 616,042, filed June 1, 1984, now abandoned, such continuation is a division of Applicants's Ser. No. 340,439 now issued as U.S. Pat. No. 4,453,400.

BACKGROUND AND SUMMARY OF THE INVENTION

This invention relates to the art of detecting a liquid level, which is particularly useful in detecting leaks in liquid storage tanks. More particularly, this invention relates to the art of detecting leaks in tanks used for storing hydrocarbon-based fuels.

To detect a loss of 0.02 gallons of liquid per hour from a storage tank capable of storing 1,000 gallons or more, e.g., an underground gasoline storage tank, by determining changes in the liquid level in the tank can be very difficult. By way of illustrating this difficulty, consider a cylindrical tank oriented on its side having a length of 21.3 feet and a diameter of 8 feet. When half full of liquid, such a tank would contain about 4,000 gallons. If one gallon were removed from such a tank, assuming all other relevant variables to be discussed hereinafter were held constant, the level of the liquid measured relative to the lowest point of the tank would change from 4 feet to 3.9992 feet, i.e., a change in the liquid level of $7.85 \times 10^{-4}$ feet. Accurate detection and measurement of such a minute change in the liquid level in an underground storage tank is extremely difficult.

Furthermore, even when such a change in a liquid level can be accurately and reliably measured, the change may not always be due to a loss of liquid. For example, even if there were no leaks in such a tank, a change in temperature of the liquid, e.g., gasoline, of 0.25° F. would cause a density change of 0.01139 lb/ft$^3$ cubic feet per pound, resulting in a change in the observed liquid level of $7.85 \times 10^{-4}$ feet. Thus, a decrease in temperature of only 0.25° F. would change the gasoline level in such a tank by the same amount as would the removal of one gallon of gasoline.

Consider also the impact of evaporation. Assume, for example, that such a tank were half filled with gasoline at 70° C. and that the air at about one atmosphere above this gasoline in the tank had substantially no gasoline vapor. The level of liquid would change by $7.38 \times 10^{-3}$ feet as a result of the vapor above the liquid changing from containing substantially no gasoline vapors to being saturated in gasoline vapors. Such a decrease in the gasoline level would be approximately the same as that caused by the removal of 9.40 gallons of gasoline.

Accurate detection of the loss of liquid from storage tanks has important environmental and safety consequences, particularly in storage tanks used for storing hydrocarbon-based fuel. Even relatively small losses from such tanks can present a safety hazard and pollution concern. As a result, there are a number of leak detecting devices known in the art that are designed to detect and measure leaks. Because gasoline service stations usually employ several such tanks disposed underground, such devices often are capable of detecting leaks where visual perception of the tank is impossible.

Three objectives in the design of such leak detection devices are that they be (1) easy to use, (2) highly reliable, and (3) safe. Testing for leaks occurs throughout the world and is performed by a large number of persons of varying degrees of skill often in unpredictable and adverse environmental circumstances. Replacement of an underground tank is a costly and time-consuming task, but, if required, must be done quickly, especially when the stored liquid is a hydrocarbon-based fuel such as gasoline, which is highly volatile.

An apparatus and method capable of detecting and measuring such minute changes in the level of liquid is described in U.S. patent application Ser. No. 208,608 which has been assigned to the assignee of the present invention. Briefly, one embodiment of that invention is an apparatus capable of detecting extremely small changes in the relative distance between a float means and both a signal source and a detector. The float means floats in a storage tank containing a liquid. The signal source and the detector remain in a fixed position relative to the storage tank. Changes in the height of the float means, which can be detected by the signal source and detector, indicate changes in the level of the liquid stored therein. Detection and precise measurement of the changes in the height of the float means, in the manner briefly described below and more fully described in U.S. patent application Ser. No. 208,608, which is expressly incorporated herein by reference, permit accurate measurement of leaks in the storage tank.

The apparatus of that invention comprises in combination: a signal means for providing or emitting a signal having a characteristic; a detector means for detecting a modulated signal by producing a response signal directly related to the characteristic; a support means for positioning the signal means and the detector means; and a float means comprising a means for floating at a desired depth in a selected liquid and a reservoir means for holding a measuring medium. The detector means and the signal means are fixedly connectable to the support means. The float means is movably connectable to the support means. Therefore, the measuring medium held in the reservoir of the float means is permitted to move relative to the signal means and the detector means. The signal, as emitted by the signal means, is modulated by the measuring medium. The detector means is oriented to detect the modulated signal. The amount by which the emitted signal is modulated by the measuring medium to produce a modulated signal varies with changes in the location of the float means.

An example of a signal means is a conventional light bulb.

An example of a detector means is a photo resistor which, for example, uses cadmium sulfide.

An example of a signal is electromagnetic radiation such as would be emitted by a conventional light bulb.

An example of a characteristic of a signal is intensity.

An example of a float means is a hollow, elongate tube of a predetermined weight having a closed end at a desired depth in the liquid. The float means may, for example, be constructed of a plurality of sections of tubing, such as 2½ inch diameter aluminum tubing, with the bottom section being a closure means for forming the closed end of the tube. The sections may be of convenient lengths and may be interconnected by any suitable means such as being threaded into one another.

An example of a measuring medium is a liquid having a k value defined in relation to Beer's Law in the range of about 0.1 to 1,000 reciprocal centimeters. Preferably, the k value of the measuring medium has a value in the range of about 20 to about 200 reciprocal centimeters.

Thus, for example, a float means having a reservoir holding a measuring medium is positoned to float at a desired depth in a liquid while being movably connected to a support means. A photo resistor and a conventional light bulb are fixedly connected to the support means, which, in turn, is fixed relative to the storage tank. As a consequence, the float means and its measuring medium are allowed to change position relative to the light bulb and photo resistor as the level of liquid in the tank changes. The light bulb emits electromagnetic radiation having a specific intensity. The photo resistor is positioned in the reservoir and detects the intensity of the light as modulated by the measuring medium. A change in location or height of the float means results in a change in the amount of measuring medium between the photo resistor and the light bulb, thus modulating the electromagnetic radiation detected by the photo resistor. Changes in the resistance of the photo resistor indicate changes in the location of the float means.

An improvement to this method involves locating the float means at a predetermined depth calculated such that temperature variations of the liquid in the storage tank do not change the depth at which the float means floats freely. In other words, a substantially temperature invariant floating position is maintained by the float means. The approximate depth at which the float means is maintained is calculated by dividing the volume of the selected liquid in which the float means is floating by the free surface area of the selected liquid. A still further improvement to the method involves saturation of the vapor space of the storage tank with the liquid therein so as to minimize evaporation of the stored liquid during measurement of the location of the float means.

The float means of the aforementioned apparatus contains weights of predetermined weight in the bottom thereof to maintain the float means in a substantially vertical orientation within the liquid in the storage tank. Use of specifically calculated weights permits floating the float means at a desired depth in the selected liquid. The float means includes a reservoir means for holding the measuring medium. Advantageously, the float means is constructed from elongated tubing such as 2½ inch diameter aluminum tubing. Because the buoyancy factors acting on the float means can be calculated, further calculations can be used to determine the proper amount of weights to be placed in the float means to maintain it at the desired depth. Once these calculations are performed and the proper amount of weights is added, the reservoir is inserted into the top of the float means prior to insertion of the assembly into the storage tank for measurement.

The apparatus described in particularly useful in detecting leaks in tanks used for hydrocarbon-based fuels such as gasoline. Such tanks are often large underground horizontal cylindrical tanks where visual examination of the walls thereof is not possible. During testing of the apparatus, it was occasionally observed that the data would indicate that the float means would move relatively further downward in the storage tank under circumstances in which the level of the liquid stored therein had not changed. Thus, while the data recorded by the apparatus would indicate the presence of a leak, in fact, no leak existed. While such a condition would not detract from the safety of the leak detector device or its ability to detect actual leaks, it would on occasion produce data which was falsely indicative of leaks.

It was not known whether the false data indicating the presence of a leak was caused by a reduction in the volume of the liquid due to circumstances other than a leak such as due to changes in its density, by failures in the test data recording apparatus, or by other causes such as an unexplainable tendency of the float means to slowly sink in the liquid. As can be readily appreciated, any factors tending to cause minute variations in the height of the float means over time, other than an actual change in the level of the liquid, would tend to indicate changes in the level of the liquid stored in the tank when, in fact, no such changes had occurred. Even the most minute increases in the depth at which the float means floats, which changes the relative height of the top of the float means and the reservoir mounted thereon, tends to indicate, falsely, substantial leakage.

It was discovered that condensation of vapors within the float means increased the weight of the float means, resulting in small but detectable changes in the position of the float means. These changes in depth of the float means were found to be responsible for the false data indicating leaks in the storage tank. The existence of even just a few drops of condensate on the inside of the float means was sufficient to cause the data to suggest false leaks. It is believed that this problem is particularly acute where the vapor space above the stored liquid is saturated with fluid vapors, as is practiced in one embodiment of the invention disclosed in U.S. patent application Ser. No. 208,608. Saturation of the vapor space may be accomplished by extending a suction line to the bottom of the tank, as, for example, within approximately 12 inches thereof, and by pulling some of the liquid stored in the tank up through the suction line by means of a self-priming pump and forcing the liquid through a spray head located in the vapor space of the tank. Of course, where the stored liquid is a hydrocarbon-based fuel, the pump should be explosion-proof. Preferably, the spray head is located approximately three to six inches below the top of the tank and is of the type that distributes the liquid in a fan pattern. To ensure complete saturation, the spray head may be rotated during the saturation process. Saturation may also be accomplished by spreading a thin layer of the liquid on the exposed surfaces within the vapor space above the liquid. It may also be accomplished by bubbling gas vapors through the liquid stored in the tank so that the saturated gas vapors displace the unsaturated vapors above the liquid. While saturation of the vapor space prevents the problem encountered when the stored liquid evaporates, it is believed to enhance the possibility of condensation forming on the inside of the float means. Furthermore, when the liquid stored is a hydrocarbon-based fuel such as gasoline, the vapors thereof are readily susceptible to condensation. The present invention eliminates the problem of condensation within the float means through the use of a deformable plug capable of forming a vapor tight seal at the upper, open portion of the float means. A plug is used to seal the float after the proper amount of weights have been added to it. Preferably, the deformable plug comprises a pressure deformable sealing ring. An example of material suitable for use in a plug of this invention is rubber, so that it may be removed and resealed within the float means. In this way, fluid vapors are prevented from entering the float means and condensing therein.

Thus, it is an object of the present invention to provide an improved apparatus and method for detecting leaks in liquid storage tanks.

It is a further object of the present invention to provide a simple and easy to use apparatus and method capable of detecting small leaks, e.g., as little as 0.02 gallons per hour in a tank capable of storing 1,000 gallons or more, without giving false readings indicating a leak.

These and other objects, features and advantages of the present invention will become apparent in the following detailed description.

BRIEF DESCRIPTION OF THE DRAWINGS

FIG. 5 is a detailed view partially in cross section of a portion of the embodiment of this invention shown in FIG. 1, showing placement of the plug below the reservoir.

FIG. 6 is a detailed view in cross section showing a manner of connecting the tube sections shown in FIG. 1.

DETAILED DESCRIPTION OF THE PREFERRED EMBODIMENT

Figure 1:
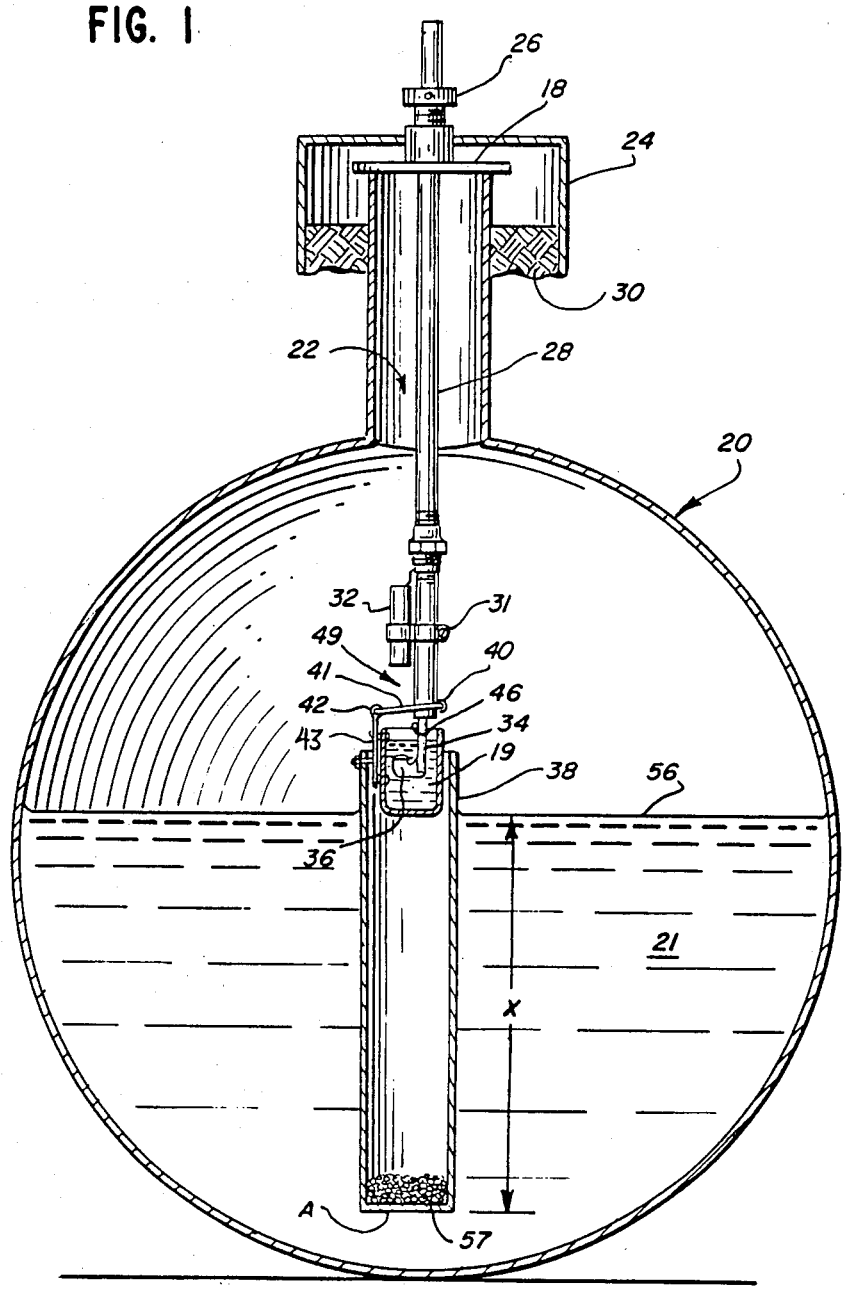
FIG. 1 discloses a side elevation view partially in cross section of a tank containing an embodiment of an apparatus of this invention.

FIG. 1 discloses an underground tank 20 in ground 30. Tank 20 comprises a cover support 24, a height adjustment screw 26, cover plate 18 and a supply opening 22. Connected to height adjustment screw 26 is a tubular support 28. Fixedly attached to tubular support 28 is a signal source 32 and a detector support 34. Float means 38 comprises an elongated hollow tube 80 having a first end 82 and a second end 84, with the first end 82 being sealed. In the preferred embodiment shown, tube 80 is constructed of a plurality of tube sections, including at least one closure means 81 for forming the closed first end 82 of the tube 80 and at least one open-end top tube section 87. The tube 80 may also include one or more open-end intermediate tube sections 83 and 85, as shown. In this way, float means 38 of varying lengths may be constructed in the field so as to accommodate different sized storage tanks. Tube sections 81, 83, 85 and 87 may be joined by any suitable means such as by being threaded into one another, as is shown in detail in FIG. 6, provided that a fluid tight seal is formed. For example, if the closure means 81 has an inside thread at its open end, and if the top tube section 87 has outside thread at one end, and if the intermediate tube sections 83 and 85 each have inside threads on one end and outside threads on the other end, all of the threads being complementary, the tube sections 81, 83, 85 and 87 may be threaded together to form a single continuous float means 38 of desired length as shown in FIG. 1. Other means for accomplishing this end are known to those skilled in the art. .

Float means 38 also contains weights 57 at the first end thereof to maintain a substantially vertical orientation. Float means 38 is pivotally attached to tubular support 28 by means of a hinge 49 comprising: a first pivot 40, a second pivot 42, a primary lever 41 and a secondary lever 43.

Figure 2:
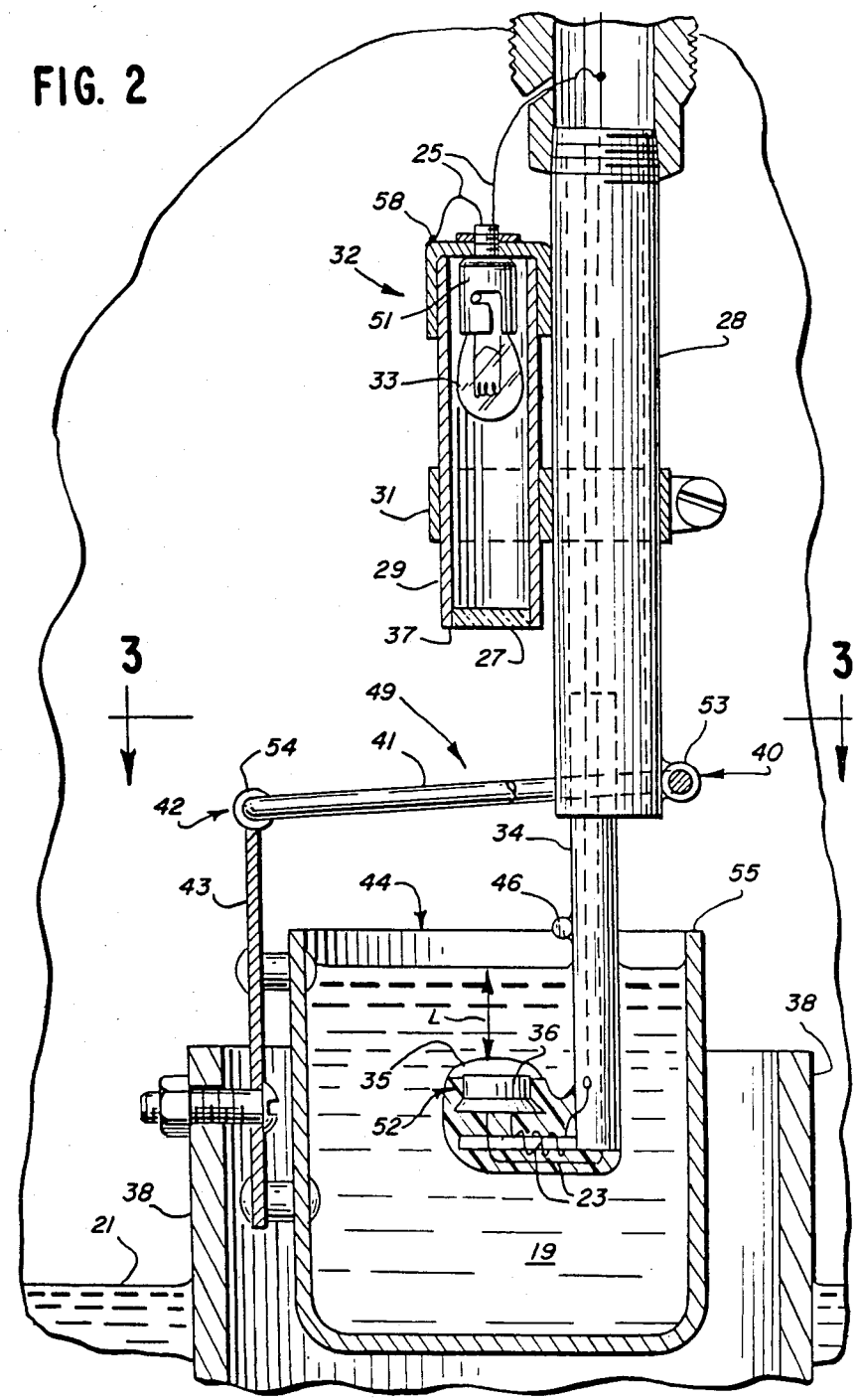
FIG. 2 discloses an enlarged view of a portion of the embodiment of this invention shown in FIG. 1.

FIG. 2 shows an enlarged drawing of a portion of the embodiment of the apparatus of this invention which is shown in FIG. 1. FIG. 2 discloses a signal source 32, a reservoir 44, a photo resistor or detector means 36, a detector support 34, a hinge 49, a float means 38, a band clamp 31, electrical leads 23 and 25, an India ink solution or measuring medium 19, and gasoline or a selected liquid 21. Signal source 32 comprises a housing 29, a plexiglass window 27, a bulb 33, and a bulb socket 51. The electrical connections of signal source 32 are carfully insulated so as to minimize any risks associated with gasoline vapors. Further, the housing 29 and plexiglass window 27 form a vapor tight seal 37 to maintain the compartment containing bulb 33 and bulb socket 51 free from any explosive vapors. Hinge 49 comprises a first pivot 40, a second pivot 42, a primary lever 41, and a secondary lever 43.

Signal source 32 is fixedly attached to tubular support 28 by means of a band clamp 31. A detector support 34 is held in a fixed position relative to tubular support 28. At one end of detector support 34 is located a photo resistor 36 within a sealed compartment 52. A curved glass cover 35 fits over photo resistor 36 or detector means 36 and keeps any India ink solution 19 outside sealed compartment 52. Electrical leads 23 from photo resistor are attached as shown in an electric circuit schematically shown in FIG. 4. One end of leads 23 is directly attached to the mV recorder input 62 and the other end is directly connected to the mV recorder input 63 through ground 58. Electrical leads 25 are attached at one end to ground 58 and at the other end to a voltage source (not shown) which must maintain a substantially constant voltage to the filament of bulb 33 so that the intensity of light emitted by bulb 33 does not vary significantly.

Briefly, the operation of the apparatus is as follows:

The float means 38, which is movably attached to tubular support 28, is capable of moving relative to tubular support 28. Since float means 38 contains weights 57 (FIG. 1), it maintains a substantially vertical orientation within gasoline 21. A predetermined number of weights 57 are inserted into float means 38 prior to insertion of plug 90.

As best shown in FIG. 5, the deformable plug 90 capable of forming a vapor-tight seal on the inside of the second end 84 of tube 80 is used to seal the float means 38 after the proper amounts of weights have been added. Preferably, the deformable plug 90 includes a pressure deformable sealing ring 92, made of rubber or other elastic material, for forming a vapor-tight seal at the second end 84 of float means 38. A thin film of silicone grease or other such substance may be applied to the sealing ring to allow easy insertion and removal. The installed position of the plug is such that it is adjacent to and relatively below the position of the reservoir when mounted to the float means. Preferably, the plug 90 is installed within two inches from the bottom of the reservoir 44, which, in the embodiment disclosed, would be approximately 4½ inches from the top of the second end 84 of the float means 38. Because float means 38 remains in a substantially vertical orientation due to natural buoyancy forces, only one hinge 49 is required, although others may be used.

The first pivot 40 comprises a ¼" stainless steel tube 53 which is attached to tubular support 28 and a primary lever 41 which is pivotally mounted within tube 53. Second pivot 42 comprises a ¼" stainless steel tube 54 into which primary lever 41 is inserted and pivotally mounted in a manner similar to that of first pivot 40, and a second lever 43 is fixedly attached to ¼" stainless steel tube 54. The main purpose of hinge 49 is to permit movement of float means 38 relative to tubular support 28. Other arrangements can be used which fulfill the same purpose as hinge 40. Reservoir 44 is fixedly attached, e.g., either directly or indirectly, to secondary lever 43. Similarly, float means 38 is fixedly attached, e.g., directly or indirectly, to secondary lever 43. As float means 38 moves up or down in response to changing buoyancy forces, e.g., due to loss or gain in the amount of gasoline 21 in tank 20, reservoir 44 changes position relative to detector means 36. Since both signal source 32 and detector means 36 are in a fixed position relative to tubular support 28, the relative position of a signal source 32 to detector means 36 remains constant throughout changes in location of float means 38. For example, as float means 38 moves upward, reservoir 44 fixedly attached to float means 38 also will move upward relative to tubular support 28. The amount of India ink solution 19 above photo resistor 36 indicated by double arrow "L" will increase as float means 38 moves upward and decrease as float means 38 moves downward relative to tubular support 28. Light from signal source 32 provided by bulb 33 passes through a plexiglass window 27 and between the arms of primary lever 41, then through India ink solution 19 having a thickness of "L" and finally impinges upon photo resistor or detector means 36. The distance "L" as it increases will cause a decrease in the intensity of light picked up and absorbed by photo resistor or detector means 36.

Figure 3:
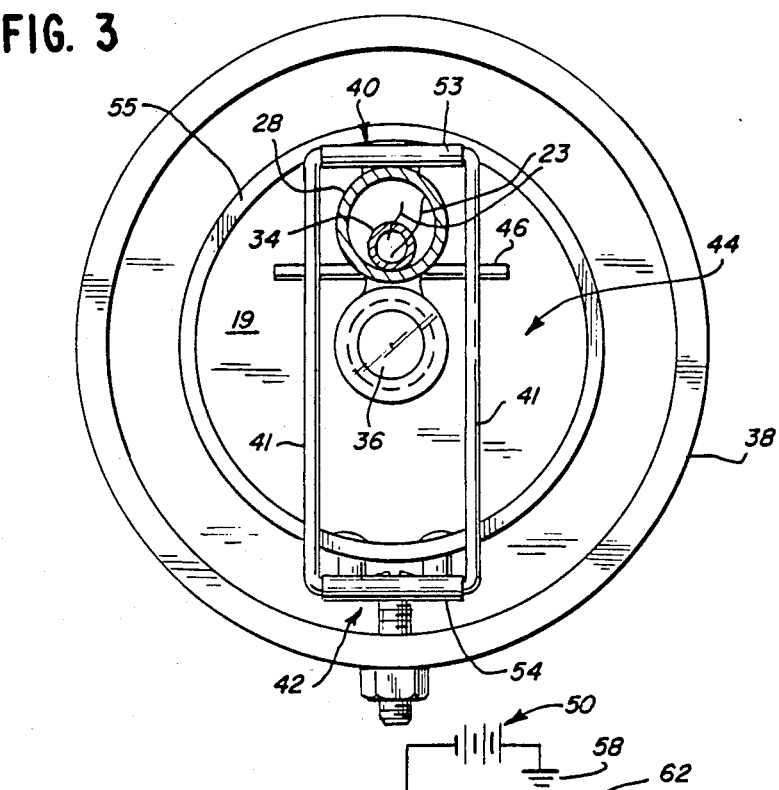
FIG. 3 is a top view along line 3—3 of FIG. 2.

FIG. 3 is a top view along line 3—3 of FIG. 2. FIG. 3 discloses tubular support 28, detector support 34, detector means 36, first pivot 40, second pivot 42, primary lever 41, cross bar 46 and reservoir 44 containing a measuring medium 19. Cross bar 46 fixedly attached to detector support 34 is useful to aid insertion of the device of this invention by limiting the amount of movement around first and second pivots 40 and 42. Movement around first and second pivots 40 and 42 is limited because primary lever 41 contacts cross bar 46 when the maximum amount of counterclockwise rotation around first pivot 40 occurs. In other words, as the device of this invention as shown in FIG. 2 is withdrawn through supply opening 22, primary lever 41 rotates in a counterclockwise rotation around first pivot 40. This counterclockwise rotation continues until primary lever 41 contacts cross bar 46. Since further counterclockwise rotation is precluded after primary lever 41 contacts cross bar 46, the remaining portion of this invention fixedly attached to secondary lever 43 then begins to move as tubular support 28 moves.

Clockwise rotation around first pivot 40 will be limited due to contact between top surface 55 of reservoir 44 and first pivot 40. This limitation to clockwise rotation is necessary to maintain the proper relationship of hinge 49.

Figure 4:
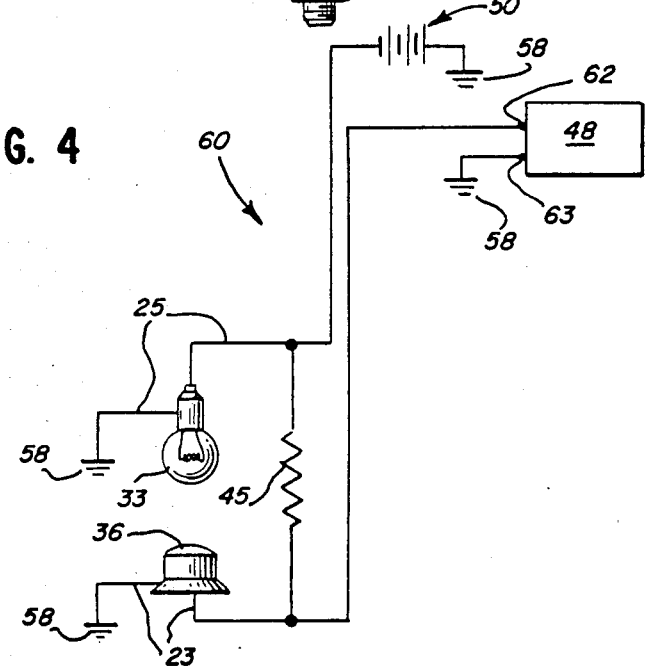
FIG. 4 discloses a schematic diagram of electrical connections from a photo detector to a millivolt (mV) strip chart recorder. The electrical connection converts resistance across the photo detector into millivolts.

FIG. 4 discloses a schematic measuring circuit 60 which includes electrical leads 23 of detector 36. Measuring circuit 60, comprising a constant voltage source or battery 50 and a resistor 45, is connected across detector 36. Resistor 45 and detector 36 are in series with one another. The voltage differences across detector 36 are measured and recorded by means of millivolt recorder 48 on strip chart 61 (not shown). Battery 50, for example, can have a voltage of 1.5 volts when resistor 45 has a resistance of about 100,000 ohms. Detector 36 preferably uses cadmium sulfide.

Measuring circuit 60, shown schematically, converts the resistance across detector 36 into a voltage differential across detector means 36. This voltage differential across detector 36 is measured and recorded by millivolt recorder 48 on a strip chart 61. The voltage source 50 must be substantially constant not only to keep the intensity from bulb 33 substantially constant, but also to keep the total voltage drop across both resistor 45 and detector 36 substantially constant.

The apparent resistance across detector 36 will vary depending upon the intensity of light radiation impinging thereon. The amount of transmitted light radiation reaching detector 36 from light source 33 will vary, all other factors being equal, logarithmically with the height L of liquid 19 (FIG. 2).

It is possible by varying the weights 57 to position float means 38 at a depth so that changes in the height of surface 56 due to temperature changes of the gasoline will not cause float means 38 to change its position. The depth required to make float means 38 invariant to changes in temperature of the gasoline and/or tank will depend upon the particular linear coefficients of expansion for the liquid 21, the tank 20 and the float means 38. This depth is approximately equal to the liquid volume divided by the free liquid surface area 56 (FIG. 1).

While this invention has been disclosed with reference to specific embodiments, these are intended to be illustrative only. Variations on the specific embodiments are clear to persons of skill in the art and are intended to be within the scope and spirit of this invention.

We claim:

1. A method for detecting small leaks in a tank storing a liquid, said tank having
   a float means positioned in contact with said stored liquid,
   a detector means and
   a signal means in fixed relationship to each other,
said float means moving in relationship to the level of said stored liquid and having a reservoir means for holding a measuring medium, said measuring medium being capable of modulating a signal characteristic representative of the position of said detecting means, comprising
   sealing said float means to prevent the condensation of vapors within said float means,
   positioning initially said float means at a depth approximately equal to $V_L/S_L$,
      said $V_L$ comprising the volume of said stored liquid and $S_L$ comprising the free surface area of said stored liquid,
   emitting a signal having a characteristic from said signal means into said measuring medium,
   modulating said signal characteristic by an amount which varies with the changes in the location of said float means,
   detecting said modulated signal characteristic, and
   producing a response signal directly related to said detected characteristic,
wherein changes in said response signal are indicative of small leaks in said tank.

2. A method for detecting small changes in the location of a float means in a stored liquid comprising
   sealing said float means to prevent the condensation of vapors within said float means,
   positioning initially said float means at a depth approximately equal to $V_L/S_L$,
      said $V_L$ comprising the volume of said stored liquid and $S_L$ comprising the free surface area of said stored liquid,
   emitting a signal having a characteristic, modulating said signal characteristic by an amount which varies with the changes in the location of said float means, detecting said modulated signal characteristic, and producing a response signal directly related to said detected characteristic, wherein changes in said response signal are indicative of small changes in the location of said float means.

3. The method of claim 2 wherein said modulating step comprises immersing in a measuring medium a means selected from a group consisting of an emitting means and a detecting means for said modulated signal characteristic, and varying the depth of said selected emitting or detecting means in said measuring medium by an amount which varies with the changes in the location of said float means.

4. The method of claim 2 comprising additionally positioning said float means at a desired depth in said stored liquid.

5. The method of claim 2 comprising additionally positioning said selected emitting or detecting means in fixed relationship to the non-selected emitting or detecting means irrespective of the location of said float means.

6. The method of claim 5 wherein the space above said stored liquid is saturated with vapor of said stored liquid prior to determining changes in the location of said float means.

7. A method for detecting small leaks in a tank storing a liquid by determining changes in the location of a float means in contact with said stored liquid comprising using an apparatus comprising a means for emitting a signal having a characteristic, and a means in fixed relationship to said emitting means for detecting said signal characteristic and for producing a response signal directly related to said detected characteristic, said float means including a means for floating at a desired depth in said stored liquid and a reservoir means for holding a measuring medium, wherein said emitting means and said detecting means are positioned with respect to said measuring medium to cause said signal characteristic to be modulated by said measuring medium by an amount which varies with the changes in the location of said float means, thereby producing a modulated signal, sealing said float means to prevent the condensation of vapors within said float means, positioning initially said float means at a depth approximately equal to $V_L/S_L$, said $V_L$ comprising the volume of said stored liquid and $S_L$ comprising the free surface area of said stored liquid, emitting said signal having a characteristic, modulating said signal characteristic by an amount which varies with the changes in the location of said float means, detecting said modulated signal characteristic, and producing a response signal directly related to said detected characteristic, wherein changes in said response signal are indicative of changes in the location of said float means.

8. A method for detecting leaks in a storage tank containing a liquid comprising the steps of:

providing apparatus having, in combination, a signal means for emitting a signal having a characteristic, a detector means for detecting a modulated signal by producing a response signal directly related to said characteristic, a support means for positioning said signal means and said detector means, float means including a means for floating at a desired depth in said liquid, means for preventing condensation of vapors within said float means and reservoir means for holding a measuring medium, said float means being movably connected to said support means, and said detector means and said signal means being fixedly connected to said support means so that said signal when emitted by said signal means will have said characteristic of said signal modulated by said measuring medium by an amount which varies with changes in location of said float means to produce a modulated signal, and said detector means being oriented to detect said modulated signal;

positioning said float means in said storage tank and allowing said float means to float in liquid in said storage tank at said desired depth; and determining changes in location of said float means by monitoring said response signal.

* * * * *